July 16, 1957 W. E. BARR ET AL 2,799,628
METHOD FOR OBTAINING INCREASED DEPTH OF FLASH VAPORIZATION
Filed April 24, 1953
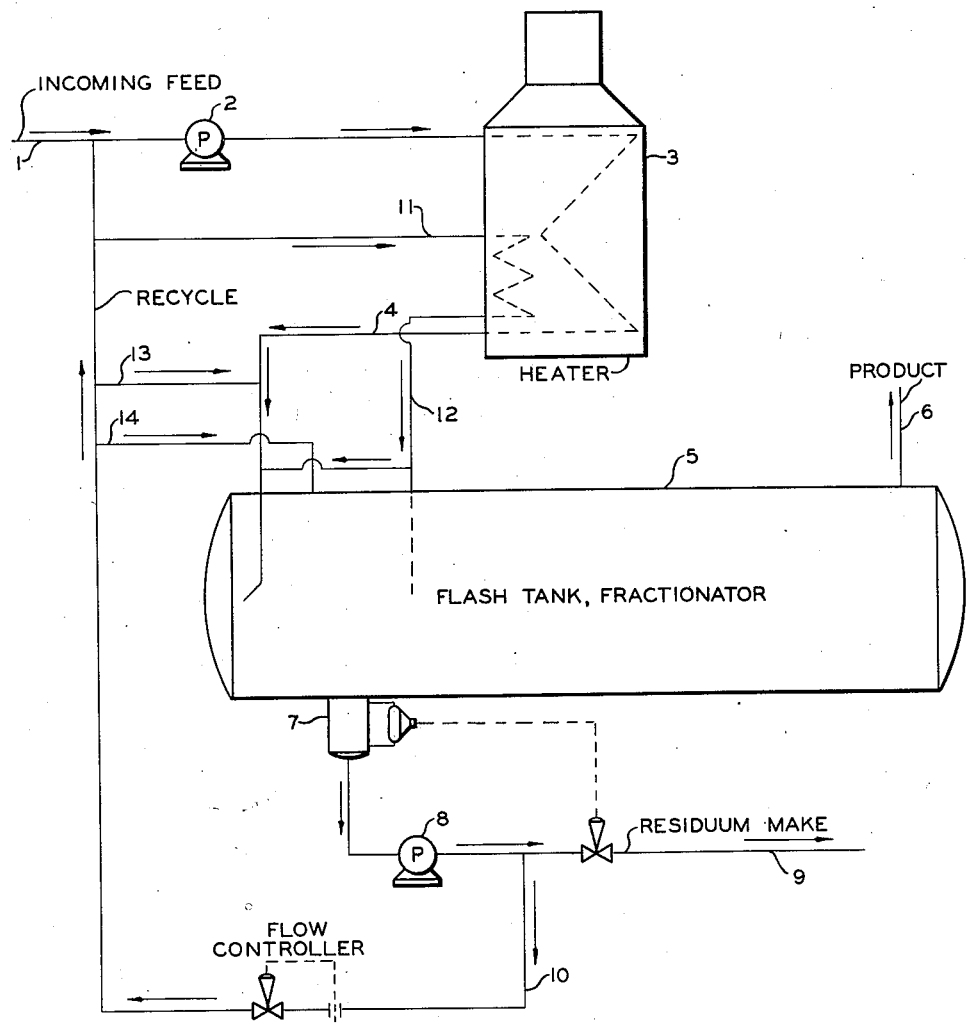
INVENTORS.
C. H. OWEN
W. E. BARR
BY
Hudson & Young
ATTORNEYS

United States Patent Office 2,799,628
Patented July 16, 1957

2,799,628

METHOD FOR OBTAINING INCREASED DEPTH OF FLASH VAPORIZATION

William E. Barr and Charley H. Owen, Phillips, Tex., assignors to Phillips Petroleum Company, a corporation of Delaware Application April 24, 1953, Serial No. 351,017

8 Claims. (Cl. 196—83)

This invention relates to the art of distillation, especially to the art of distillation of oils, for example, hydrocarbon oils. In one of its aspects this invention relates to the distillation of hydrocarbon oils in a manner such that safe, yet effective distillation temperatures can be employed. In another aspect, the invention relates to increasing the depth of flash which is obtainable in a flash vaporization system without employing temperatures above those which are safe, that is, temperatures which would cause undesired decomposition of the oil being distilled. In still another aspect of the invention it relates to a distillation process in which the temperature of the incoming feed, while maintained constant, is not raised above that normally employed in such a process, yet, nevertheless, there is supplied to the distillation vessel an increased quantity of heat.

In the ordinary methods of separating lower boiling components in the form of vapor from higher boiling components of a material in the form of a liquid employing flash vaporization systems, the feed has been preheated to a temperature sufficiently elevated that when the feed is introduced into the flash system the desired flash vaporization will occur. In many instances there is a maximum temperature above which the feed should not be heated in order to avoid deterioration or decomposition of either the products desired or undesired decomposition of the liquid residue. Therefore, the usual method of introducing the feed into a flash chamber being such that an adiabatic flash separation occurs, there results a lowering of temperature and a loss of heat which is taken up when the vaporous portions are obtained by the flashing which is effected. Therefore, the resulting equilibrium flash temperature is lower than that of the incoming feed by an amount approximately equivalent to the heat of vaporization of the vapors. With a thus reduced equilibrium temperature, the amount of overhead vapor flashed, at any given pressure, can only be compensated for by an increased feed temperature, which, as stated, may not be practicable or desirable due to the characteristics of the feed stock, that is, the feed stock may be subjected to undesirable change or decomposition.

It is known in the art to remove an unvaporized oil fraction from an oil distillation column and to treat the same to remove gas therefrom. Following the removal of gas from the said oil in a so-called "coalescing chamber," a portion of the unvaporized oil is cooled and circulated to the top of the said coalescing chamber. Thus, the oil in the said coalescing chamber is at a temperature below that at which it entered the said chamber. The effect of the cooled recirculated oil impinging upon the oil in the coalescing chamber is to break up any foam and cause its coalescence. The gas which is disengaged from the unvaporized oil in the coalescing chamber is returned to the vaporizing section of the distillation column. The balance of the oil withdrawn from the coalescing chamber is then heated and commingled with the hot feed to the distillation column. It is to be noted that the method just described involves first a removal of heat which is lost and then made up again by adding additional heat to the oil. In the column of the art just described, it appears that the removed unvaporized oil fraction contains or is diluted with reflux liquid condensed from the flashed vapors.

We have found simple, yet effective, means and method to overcome the aforesaid lower equilibrium flash temperature, which is caused by the adiabatic expansion of the heated feed, which comprises recycling directly through the heater with the feed, without any intermediate treatment whatsoever, a stream of residual oil from a flash chamber or zone free from any of the vapors in any form. Thus, additional heat is passed into the distillation column or flash chamber without any cooling of the oil withdrawn therefrom. This involves not only the elimination of a step but also a considerable heat saving. It is especially noteworthy that in the operation just set forth the residual oil being free from any of the vapors in any form, that is, either as reflux, condensate, or as occluded vapor, an intermediate step has been eliminated.

According to the present invention, therefore, there is provided a simple, yet effective method for the distillation of liquids for their separation into vaporous and non-vaporized fractions, for example, the vaporization of hydrocarbon oils, which comprises heating a liquid to be distilled and fractionated to a predetermined flash vaporization or distillation temperature, conveying the said preheated liquid into a flash vaporization or distillation zone or vessel, therein causing vaporization of that portion of the liquid which will vaporize under the conditions prevailing at the point of introduction of the said preheated liquid, removing and recovering vapors thus formed, withdrawing liquid or unvaporized residual liquid from the said flash vaporization vessel free from vaporous material in any form, imparting heat to the said withdrawn liquid, and returning the said liquid to the said zone. In one embodiment of the invention, the preheated feed and liquid are fed to the same point in the said zone, namely, to the locus of flash vaporization.

It is clear that the residuum being flashed at the pressure in the flash zone of the flash vaporization chamber or vessel will act as a heat carrier medium and that virtually none of this returned oil is flashed on recycle. Thus, the method of this invention results in the supply of an additional amount of heat to the flash system without raising incoming feed temperature. Therefore, there is avoided any undesired decomposition or overheating of either the vapors or the non-vaporized liquid. Thus, the invention increases the depth of flash possible at a given flash pressure and feed temperature.

By the actual in-the-field experience on operating units, successful increase of the depth of flash has been obtained employing the method of this invention.

According to the invention, and as still a further feature thereof, a portion of the residuum from the distillation or flash system can be heated directly to a temperature equal to or above the temperature to which the original charge is heated. In this modification, the oil is rapidly heated, say 5 to 50° F. above the original charge temperature, by being passed through a rapid heating zone in such a short time that no time sufficient for any significant decomposition thereof can occur, and is passed immediately to the flash zone or system thereby being immediately quenched or cooled to below a temperature at which decomposition thereof can occur, thus adding additional heat to the system without adversely affecting the original charge thereto and also thereby increasing the total depth of flash which can be obtained.

Referring now to the drawing, a hydrocarbon oil feed which is to be separated into distillate and unvaporized residue is fed through line 1 by means of pump 2 through a preheater 3 in which it is heated to a temperature in the range 700–800° F. or thereabouts. The temperature to which the stock is heated will depend upon the exact nature of the stock and such temperatures are well-known and practiced in the art. The preheated oil is passed from preheater 3 by means of conduit 4 into flash tank, fractionator system 5. In the flash portion of the tank, vapor separation takes place and a product is taken off at 6. This product results from portions of the feed which have been vaporized in the flash portion of tank 5. Unvaporized liquid free from the vaporous constituents, which have been flashed from the oil, in any form, collects at the bottom of tank 5 and is withdrawn therefrom at 7 by means of pump 8 and withdrawn from the system at 9. A portion of the unvaporized liquid, from which vapor which can be flashed, at a temperature of about 650 to 700° F., has been flashed therefrom, is pumped via conduit 10 to conduit 1 for admixture with the incoming feed. This portion which is admixed with the incoming feed will be preheated in preheater 3 to the same temperature as before but now since it no longer contains vaporous portions which can be separated therefrom at the originally prevailing temperature in the flash tank will not upon re-entry into the flash zone cool to the same temperature as it did before the flashable portions were flashed therefrom. This will increase the temperature which can be maintained at the flash point in the tank 5 without having to increase the temperature at which the feed leaves preheater 3. It is noted that according to this invention the unvaporized liquid is returned by way of conduit 7, pump 8, and conduit 10 to conduit 1 directly without any intermediate treatment thereof. Therefore, there is no heat loss other than that unavoidably involved in the transfer lines, and an intermediate step has been eliminated, no intermediate treatment of the unvaporized liquid being required.

As shown in the drawing, a horizontal flash tank and fractionator system are employed. It will be clear that the invention is not limited to a horizontal flash zone but only to the recovery of the non-vaporous or residual fraction free from the vaporous fractions, as set forth. Thus, according to the invention, the recycled liquid is free from reflux or other portions of the vaporous fractions or portion which is obtained in the flashing step.

It is within the scope of the invention to employ a vacuum producing means and, indeed, such is now a preferred embodiment.

In another embodiment of the invention, the unvaporized liquid is passed by way of conduit 11 through preheater 3 and conduit 12 into flash tank 5 as shown on the drawing. By introducing a portion of the preheated recycled unvaporized liquid at a point nearer the outlet of the flash tank, fractionator 5, it is possible to further increase the depth of flash of the said unvaporized liquid owing to the lower pressure prevailing at such a point. This embodiment presents a distinct advantage and is to be considered as a special feature of the invention.

In yet another embodiment of the invention, the unvaporized liquid, free from any of the vaporous portions in any form, is combined with the heated feed after it has left the heater and before it enters the flash zone. To this end conduit 13 has been provided.

As a still further feature of the invention, part or all of the recycled residuum can be directly recycled to the flash zone in flash tank, fractionator 5 without being reheated, or otherwise treated. In this manner, additional heat is introduced into the flash zone which heat would otherwise be permanently removed therefrom. To this end conduit 14 has been provided.

*Example*

|  | With Recycle | Without Recycle |
| --- | --- | --- |
| Fresh Fuel Oil Charge to 2nd Stage Vacuum Unit, B/H | 420 | 420 |
| L. V. Percent of Crude | 11.0 | 11.0 |
| ° API | 17.3 | 17.3 |
| Recycle, B/H (Residuum Flash Compt.) | 80 | 0 |
| Total Charge to 2nd Stage Vacuum Unit (Includes Recycle), B/H | 500 | 420 |
| Gas Oil Make, B/H | 134 | 114 |
| Fuel Oil Make, B/H | 286 | 306 |
| Fuel Oil Make, ° API | 15.2 | 15.5 |
| Fuel Oil Make, L. V. Percent of Crude | 7.5 | 8.0 |
| Feed to 2nd Stage Vacuum Unit, ° F | 740 | 740 |
| Flash Compt. Residuum Temperature, ° F | 712 | 702 |
| Flash Compt. Pressure, mm. Hg Absolute | 1.0 | 1.0 |

From the above table it can be seen that a net residuum reduction of 0.5 L. V. % of crude was realized by recycling 80 B/H of fuel oil from the flash compartment. This was accomplished with the same feedstock, the same feed temperature and flash zone pressure.

The inventions set forth above are especially applicable to the operations set forth and claimed in copending applications Serial Number 188,604, filed October 5, 1950, by V. C. Cavin et al., now abandoned; Serial Number 241,183, filed August 10, 1951, by Paul M. Waddill, now abandoned; Serial Number 327,890, filed December 24, 1952, by W. E. Barr, now U. S. Patent 2,760,918; and Serial Number 316,411, filed October 23, 1952, by G. A. Moyer, now U. S. Patent 2,774,723.

It will be obvious to the reader that the drawings are schematic only and that various pumps, valves, and other auxiliary equipment have been omitted for sake of simplicity.

The invention is applicable to any distillable material such as animal or vegetable oils, organic liquids, inorganic salt solutions, fruit juices, etc.

Reasonable variation and modification are possible within the scope of the foregoing disclosure, drawings, and appended claims to the invention, the essence of which is that by returning at least a portion of unvaporized liquid free from any form of the vaporous portion produced in a flash vaporization system without any intermediate treatment thereof by way of a preheater to the said system an increased depth of flash thereof can be obtained substantially as set forth and described.

We claim:

1. A method of increasing the depth of flash obtainable in the flash zone of a distillation zone in which a liquid is separated into vaporous and non-vaporous constituents which comprises heating the said liquid to a temperature in the approximate range 700–800° F. at which desirable distillation thereof can be accomplished without decomposition of the said liquid and passing the said liquid to a flash zone in a distillation zone, therein separating said liquid into vaporous constituents which are removed as product and non-vaporous constituents which are withdrawn as residue, rapidly heating said residue directly upon its withdrawal from the distillation zone in a time so short that no significant decomposition thereof can occur to a temperature appreciably above that to which the original charge liquid is heated and returning said thus heated residue to said distillation zone thereby quenching the thus heated residue to a temperature at which decomposition cannot occur.

2. In a method for the distillation of a decomposable hydrocarbon oil the steps which comprise heating the said oil to a distillation temperature in the approximate range 700–800° F., passing the thus heated oil to the flash zone of a distillation zone, therein separating vaporous and non-vaporous portions of the said oil, removing all vaporous portions as a product of the process, removing a portion of the unvaporized oil as a product of the process, removing a further portion of the unvaporized oil free from any of the vaporous portions in any form, from said flash zone and passing the same rapidly through a heater in which it is heated to a temperature 5–50° F. above that to which the original oil is heated in a quantity and in a manner such that no time is allowed for any significant decomposition of the same, and then returning the said oil directly to the said distillation zone and therein commingling it immediately with the original feed to the said flash zone.

3. A method for the distillation of liquids under conditions of flash distillation to obtain a vaporous and a non-vaporous portion thereof without significant decomposition thereof, the vaporous portion being obtained in maximum quantity by heating the feed to the distillation to a maximum possible distillation temperature which comprises increasing the heat supply in the flash zone of a flash vaporization system by returning directly thereto, without further treatment thereof, at least a portion of the unvaporized liquid which is withdrawn therefrom free from any of said vaporous portion in any form.

4. In a method for the flash vaporization of a liquid hydrocarbon material to separate it into a vaporous fraction and a non-vaporized residue fraction, without causing cracking of the same yet to obtain a maximum desired depth of flash, the steps in combination which comprise heating said liquid in a heating zone to a maximum temperature possible to be accomplished without cracking; feeding said thus heated liquid into a substantially horizontally disposed flash vaporization zone at one end thereof; at said end causing flash vaporization to occur under substantially adiabatic conditions, thus obtaining at said end a non-vaporized residue and a vaporous fraction; immediately removing said vaporous fraction without condensation thereof from said end of said zone; condensing and removing the same from said zone as a product of the process; withdrawing said non-vaporized residue free from any condensate of said vaporous fraction from said end of said zone; cycling at least a portion of said residue directly to a heating zone and therein reheating it to a temperature, appreciably in excess of that to which the original liquid feed is heated, rapidly and in a time so short that no substantial cracking can occur and then immediately discharging it from the heating zone; and then returning it to said end of said flash vaporization zone, thereby securing increased depth of flash in said end of said flash vaporization zone of the unflashed liquid fed thereto because the recycled reheated non-vaporized liquid contains no condensate or other flashable portion therein with which to use up adiabatically the additional heat which has been made available by said recycle of said heated residue.

5. In the distillation of a hydrocarbon oil comprising vaporizable constituents which comprises preheating said oil to a distillation temperature, under conditions which do not effect any significant decomposition of said oil and passing it to a distillation zone, therein flashing vaporous constituents from said oil, thus separating said oil into vaporous and non-vaporous constituents, removing vaporous constituents as a product of the distillation, removing non-vaporous products free from said vaporous constituents in any form from said zone, directly and separately heating said non-vaporous products to a temperature which is substantially that which is desired to be maintained in said distillation zone and returning said non-vaporous products thus heated to said distillation zone at a locus downstream of the flashing of the original feed to said zone.

6. In the distillation of a distillable material comprising vaporizable constituents which comprises preheating said material to a distillation temperature, under conditions which do not effect any significant decomposition of said material, and passing it to a distillation zone, therein flashing vaporous constituents from said material, thus separating said material into vaporous and non-vaporous constituents, removing vaporous constituents as a product of the distillation, removing non-vaporous products free from said vaporous constituents in any form from said zone, directly and separately heating said non-vaporous products to a temperature which is substantially that which is desired to be maintained in said distillation zone and returning said non-vaporous products, thus heated, to said distillation zone at a locus downstream of the flashing of the original feed to said zone.

7. A method for the distillation of a hydrocarbon liquid under conditions of flash distillation to obtain a vaporous and a non-vaporous portion thereof without significant decomposition thereof, the vaporous portion being obtained in maximum quantity by heating the feed to the distillation to a maximum possible distillation temperature which comprises increasing the heat supply in the flash zone of a flash vaporization system by returning directly thereto, without further treatment thereof, at least a portion of the unvaporized hydrocarbon liquid which is withdrawn therefrom free from any of said vaporous portion in any form.

8. In the distillation of a distillable material by flash distillation which comprises preheating said material to a distillation temperature, under conditions which do not effect any significant decomposition of said material, and passing it to a distillation zone, therein flashing vaporous constituents from said material, thus separating said material into vaporous and non-vaporous constituents, removing vaporous constituents as a product of the distillation, removing non-vaporous products free from said vaporous constituents in any form from said zone, directly and separately heating said non-vaporous products to a temperature which is substantially that which is desired to be maintained in said distillation zone and returning said non-vaporous products, thus heated, to said distillation zone at a locus downstream of the flashing of the original feed to said zone, also, in order to further increase the heat supply in said distillation zone, returning directly thereto, without further treatment thereof, at least a portion of said non-vaporous products free from any of said vaporous constituents in any form.

References Cited in the file of this patent
UNITED STATES PATENTS

| | | |
|---|---|---|
| 1,787,981 | Herthel et al. | Jan. 6, 1931 |
| 1,821,750 | Egloff | Sept. 1, 1931 |
| 1,844,477 | Olsen | Feb. 9, 1932 |
| 1,889,697 | Pullar | Nov. 29, 1932 |
| 1,963,888 | Coubrough | June 19, 1934 |
| 1,990,664 | Nelson et al. | Feb. 12, 1935 |
| 2,087,422 | Youker | July 20, 1937 |
| 2,443,970 | Waddill | June 22, 1948 |